April 21, 1964 J. J. LENZI 3,130,286

ELECTRIC SOLDERING GUN TIP

Filed April 11, 1961 2 Sheets-Sheet 1

James J. Lenzi
INVENTOR.

BY Clarence A. O'Brien
and Harvey B. Jacobson
Attorneys

ELECTRIC SOLDERING GUN TIP

Filed April 11, 1961 2 Sheets-Sheet 2

James J. Lenzi
INVENTOR.

BY Clarence A. O'Brien
and Harvey B. Jacobson
Attorneys

United States Patent Office 3,130,286
Patented Apr. 21, 1964

3,130,286

ELECTRIC SOLDERING GUN TIP

James J. Lenzi, 3301 White Oak Drive,
Houston 7, Tex.

Filed Apr. 11, 1961, Ser. No. 102,253
7 Claims. (Cl. 219—26)

This invention relates to a novel and useful soldering gun heating unit specifically adapted for use with the conventional type of soldering gun and to enable a plurality of terminal leads of an electronic device to be secured to junction apertures of a printed circuit panel in an efficient and non-laborious manner.

The soldering gun heating unit of the instant invention is provided with the usual pair of electrode arms. A resistor heating means interconnects corresponding ends of the electrode arms and to remote ends of the electrode arms include means adapted for securement to the electrodes of a soldering gun. The resistor heating means carried by the ends of the electrode arms remote from the soldering gun to which the heating unit is secured is provided with a laterally enlarged head portion through which at least one bore is formed. The laterally enlarged head portion is in the form of a generally plate-like head which extends transversely of the outer ends of the electrode arms. The bore or bores formed through the plate-like head are provided with frusto-conical counterbores at their outer ends remote from the soldering gun to which the heating unit is secured.

Printed circuit panels are being used more and more in the construction of electronic equipment such as radios, television, radar, etc. and these printed circuit panels are provided with suitable apertures for the reception of terminal leads of electronic devices which are to be secured to the printed circuit panels at desired locations. The apertures formed in the printed circuit panels are usually formed at the juncture of two leads formed on one side of the printed panel where it is desired to secure a terminal lead of an electronic element such as a condenser or resistor and the like to the juncture of the two leads printed on the printed circuit panel. Additionally, the bore or aperture may be formed in the printed circuit panel at the terminal end of any lead or conductor formed on the panel to which a lead terminal of an electronic device is to be soldered.

Although some printed circuit panels are provided with printed circuits on opposite sides of the same panel, most printed circuit panels have circuits printed on only one side thereof. The soldering gun heating unit of the instant invention is possibly more readily adaptable for use in conjunction with this latter type of printed circuit panel although it is to be understood that the heating unit may be varied in shape to conform to various different types of printed circuit panels and to those panels including portions of circuits printed on opposite faces thereof.

In securing a condenser or resistor to a printed circuit panel the terminal leads of the condenser or resistor and the like are inserted through the desired junction apertures or bores from one side of the panel. The soldering gun heating unit of the instant invention is provided with bores formed through the laterally enlarged head portion thereof which correspond to the desired junction apertures formed in the printed circuit panel through which the lead terminals of the condenser or resistor and the like extend. The plate-like head of the heating unit is positioned to receive the terminal leads and the plate-like head is then positioned against the face of the printed circuit panel remote from the electronic device with the leads of the electronic device projecting through the head of the heating unit. After the head of the heating unit has been positioned in this manner, the soldering gun to which the heating unit is connected may be actuated to pass the desired amount of electrical current through the electrodes of the heating gun and the electrode arms of the heating unit. The resistor heating means and the laterally enlarged plate-like head will then be heated. The heating of the plate-like head will in turn heat the portions of the electrode extending through the side of the printed circuit panel remote from the electronic device. A length of solder or similar material may then be touched to the heated terminal ends projecting through the face of the plate-like head remote from the printed circuit whereupon the solder will be heated and flow through the bores formed in the plate-like head. After a small quantity of solder has been disposed about each lead projecting through the printed circuit panel and in contact with the printed circuit of the panel, the heating unit may be removed whereupon the terminal leads of the electronic device will be firmly soldered to the desired portions of the printed circuit panel. In this manner, a plurality of leads or lead terminals of electronic devices such as condensers and resistors may be quickly secured to a printed circuit panel.

The main object of this invention is to provide a heating unit for a conventional type soldering gun which may be conveniently utilized for soldering terminal leads of electronic components to printed circuit panels in an expeditious manner.

A further object of this invention is to provide a soldering gun heating unit capable of simultaneously heating a plurality of solder connections of a printed circuit panel whereby electronic devices having leads soldered to those plurality of connections may be readily removed.

Still another object of this invention is to provide a soldering gun heating unit capable of simultaneously soldering a plurality of terminal leads of an electronic device to a printed circuit panel.

A further object of this invention is to provide a method of simultaneously soldering or unsoldering a plurality of terminal leads to and from terminal bores formed in a printed circuit panel.

A final object to be specifically enumerated herein is to provide a device in accordance with the preceding objects which will conform to conventional forms of manufacture, be of simple construction and easy to use so as to provide a device that will be ecomonically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 2:
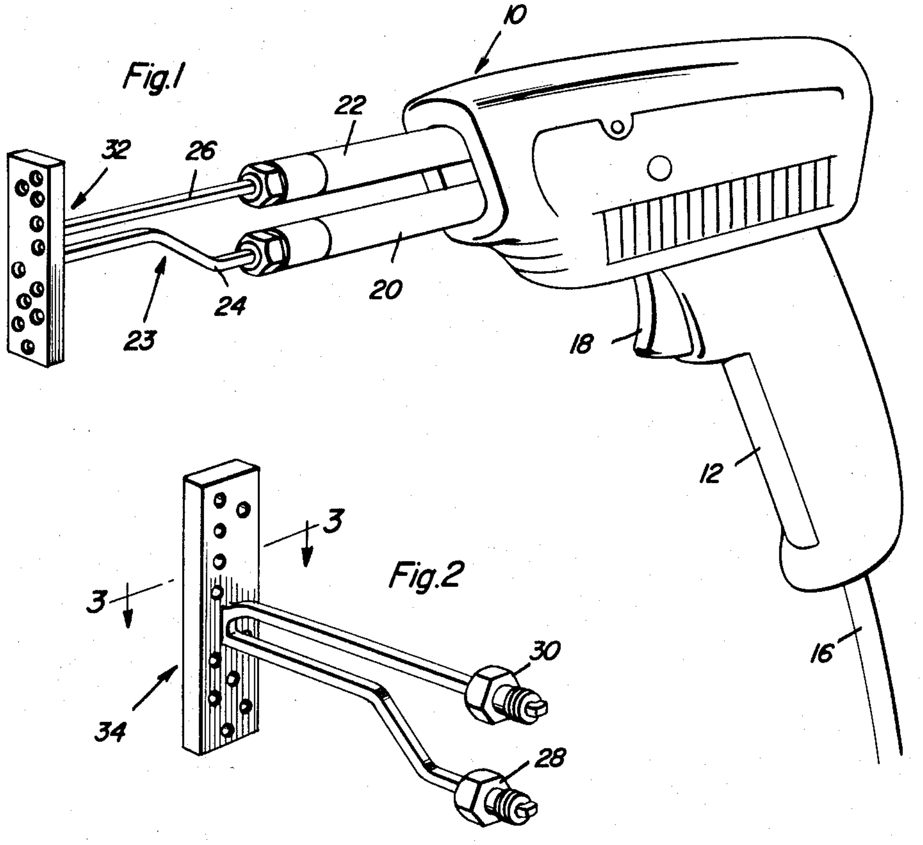
FIGURE 1 is a perspective view of a conventional type of soldering gun with the heating unit of the instant invention secured thereto.
FIGURE 2 is a somewhat enlarged perspective view of the heating unit.
Figure 3:
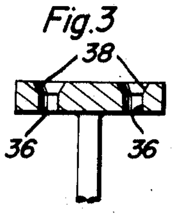
FIGURE 3 is a horizontal transverse sectional view of the plate-like head of the heating unit on somewhat of an enlarged scale and taken substantially upon the plane indicated by the section line 3—3 of FIGURE 2.

Referring now more specifically to the drawings the numeral 10 generally designates a conventional type of electric soldering gun. The electric soldering gun includes a handle portion 12 and an extension cord 16 for connecting the electrodes (not shown) of the soldering gun to a source of electrical potential. The soldering gun 10 includes a switch actuator 18 and the electrodes of the soldering gun 10 are encased in a pair of electrode housings 20 and 22 projecting from the front end of the gun 10. The heating unit of the instant invention is generally referred to by the reference numeral 23 and includes a pair of electrode arm 24 and 26 which are provided with fittings 28 and 30 respectively on their free ends that are adapted to secure the free ends of the electrode arms 24 and 26 to the electrode housings 20 and 22 respectively and in contact with the electrodes of the soldering gun 10 disposed therein.

The forward ends of the electrode arms 24 and 26 are interconnected by means of resistor heating means generally referred to by the reference numeral 32. The resistor heating means includes a laterally enlarged plate-like head generally referred to by the reference numeral 34 which extends transversely of the forward ends of the electrode arms 24 and 26. The plate-like head is provided with a plurality of bores 36 and each bore 36 is provided with a truncated shaped counterbore 38 at its end remote from the gun 10. The bores 36 extend through the head 34 and generally parallel the portions of the arms 24 and 26 immediately adjacent the head 34.

Figure 4:
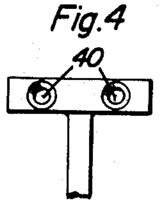
FIGURE 4 is a fragmentary end elevational view of one end of the plate-like head of the heating unit.
Figure 6:
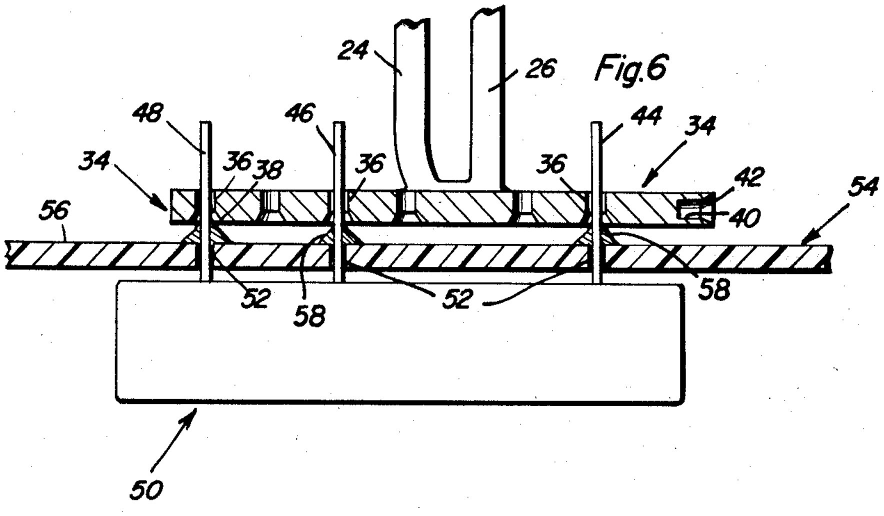
FIGURE 6 is a longitudinal sectional view of the plate-like head of the heating unit taken substantially upon the plane indicated by the section line 6—6 of FIGURE 5 and showing the manner in which the plate-like head may be used to solder the lead terminals of electronic devices such as a condenser to a printed circuit panel.

With attention directed to FIGURES 4 and 6 of the drawings it will be noted that one end of the plate-like head 34 is provided with a plurality of blind bores 40. Each of the blind bores 40 includes a truncated cone-shaped counterbore 42 similar to counterbores 38.

In operation, as electricity passes through the electrode arms 24 and 26 the plate-like head 34 will become heated. The terminal leads 44, 46 and 48 of the condenser generally referred to by the reference numeral 50 are passed through certain of the bores 52 formed in the printed circuit panel generally referred to by the reference numeral 54. Each of the bores 52 is termed a junction bore or aperture and the terminal leads 44, 46 and 48 are also passed through certain of the bores 36 formed in the plate-like head 34 which register with the junction apertures 52 formed in the printed circuit panel 54. The plate-like head 34 may then be disposed in surface-to-surface contacting relation with the face 56 of the printed circuit panel 54 remote from the condenser 50 and the switch actuator 18 may be manipulated to cause a flow of electricity through the electrode arms 24 and 26. The plate-like head 34 will then be heated. After sufficient heat is obtained, a small quantity of the desired solder 58 is supplied to each of the end portions of the terminals 44, 46 and 48 projecting through the plate-like head 34 whereupon the solder will be heated and flow down the terminal leads 44, 46 and 48 and into the frusto-conical counterbores 38 formed in the outer ends of the bores 36. A generally pyramidal shaped solder connection is formed as the solder fills the counterbores 38. The plate-like head 34 may then be removed in order to enable the terminal leads 44, 46 and 48 together with the solder 58 to cool whereupon the terminals 44, 46 and 48 will be rigidly soldered to the portions of the printed circuit (not shown) disposed about the bores 52 formed in the printed circuit panel 54.

Figure 7:
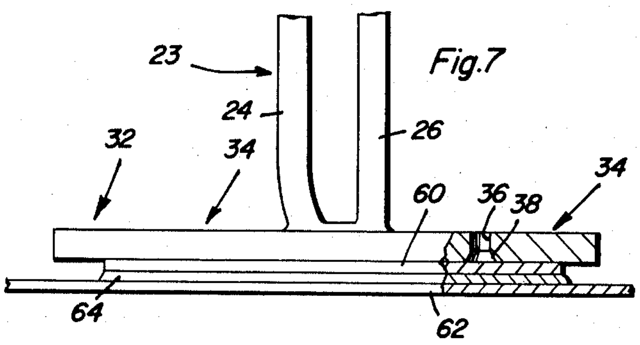
FIGURE 7 is a fragmentary side elevational view of the soldering gun heating unit showing the manner in which it may be used to apply heat to a flat surface, parts of the head of the heating unit and the flat surface being broken away and shown in section.

As may be observed from FIGURE 7 of the drawings, the plate-like head portion 34 may also be utilized to heat a flat member 60 which is to be soldered to a flat supporting surface 62 by means of solder 64. Additionally, the plate-like head 34 may of course be used to heat the solder 64 in order to remove the member 60 from the supporting surface 62.

Figure 9:
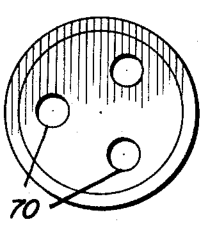
FIGURE 9 is an end elevational view of the modified form of heating element illustrated in FIGURE 8 as seen from the left side of the latter.
Figure 8:
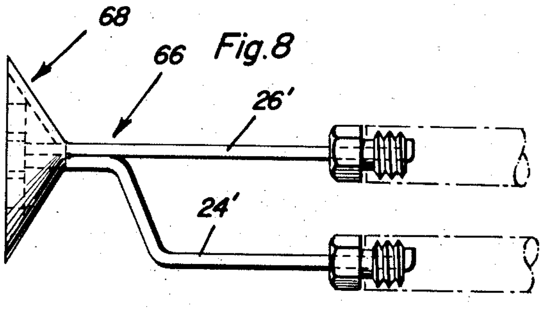
FIGURE 8 is a side elevational view of a modified form of the soldering gun heating unit.
Figure 5:
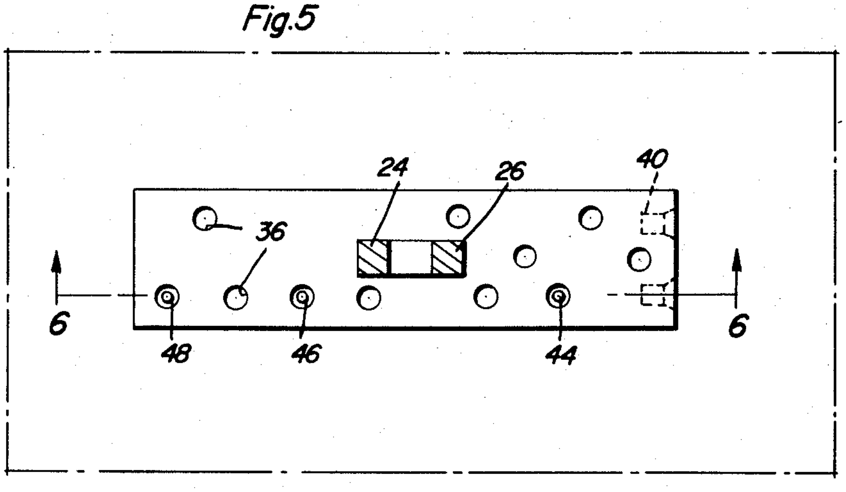
FIGURE 5 is an enlarged sectional view taken upon a plane passing through electrode arms of the heating unit adjacent the plate-like head portion thereof, the outline of a printed circuit panel being shown in phantom lines.

With attention now directed to FIGURES 8 and 9 of the drawings there will be seen a modified form of heating unit generally referred to by the reference numeral 66 which includes a pair of electrode arms 24′ and 26′ similar to arms 24 and 26. The plate-like head portion of the heating unit 66 is generally referred to by the reference numeral 68 and is generally circular in plan and provided with a plurality of bores 70. The plate-like head 68 may be utilized in the same manner as the head 34 is used but in situations wherein the size and shape of the plate-like head 34 would be undesirable.

In addition to securing the terminal leads 44, 46 and 48 to the junction apertures 52 in the printed circuit panel 54 in the manner hereinbefore set forth, the leads 44, 46 and 48 can be inserted through the bores 52 in the manner previously described. Then, small annular members of solder may be disposed on each end portion of the terminal leads 44, 46 and 48 projecting through the printed circuit panel 54. With the solder already positioned about the terminal leads 44, 46 and 48 it is then merely necessary to position the plate-like head 34 as illustrated in FIGURE 6 and as previously described with the plate-like head 34 in surface-to-surface contacting relation with the face 56 of the plate 54. Then, the plate-like head 34 may be heated whereupon the leads 44, 46 and 48 will be simultaneously soldered to the printed circuit (not shown) formed on the printed circuit panel 54.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A heating unit for printed circuits comprising a pair of electrode arms interconnected at one pair of corresponding ends by means of a plate-like member defining resistor heating means, the other pair of corresponding ends of said arms including means adapted for securement to the electrodes of a soldering gun, said plate-like member including at least one bore formed therethrough and having an outer face remote from said arms adapted to abut a printed circuit board, the end of said bore opening outwardly of said outer face being provided with a truncated cone-shaped counterbore having its major diameter end opening outwardly of said outer face.

2. The combination of claim 1 wherein said plate-like member has a plurality of bores formed therethrough said bores being formed in a predetermined pattern adapted for alignment with a plurality of junction apertures in a printed circuit panel.

3. The combination of claim 1 including a plurality of blind bores formed in one side edge of said plate-like head.

4. A desoldering tip for melting solder or other low melting joining metal used to electrically connect an electrical component having a plurality of contacts in a predetermined pattern to a printed circuit board, said tip comprising a thin main plate having a plurality of unobstructed openings therein arranged in positions adapted to correspond to the positions of the contacts of the electrical component, said openings being of a size adapted to loosely receive said contacts, said plate including one generally planar face through which said openings open defining a work face, said plate including means defining an annular contact surface about each of said openings including portions spaced laterally of said face, and connecting means connected to the side of said plate opposite the work face for heating said plate to a temperature at which joining metal will melt.

5. The combination of claim 4 wherein said annular contact surfaces each define a truncated cone-shaped counterbore having its major diameter end opening through said face whereby the raised portions of solder disposed about said terminals may be closely embraced by portions of said desoldering tip.

6. A desoldering tip for melting solder or other low melting joining metal used to electrically connect an electrical component having at least one terminal contact to a printed circuit board, said tip comprising a body having at least one unobstructed bore formed therein, said bore being of a size adapted to loosely receive one of said contacts therein, said body including one generally planar face through which said bore opens defining a work face, said body including means defining a contact surface about said bore including annular portions spaced laterally of said face and adapted to engage an amount of solder disclosed about said contacts to melt said solder while maintaining said face in spaced relation relative to said printed circuit board, and heating means operatively associated with said body for heating the latter to a temperature at which solder will melt.

7. The combination of claim 6 wherein said annular contact surfaces defines a truncated cone-shaped counterbore formed in the end of said bore adjacent said face having its major diameter end opening through said face.

References Cited in the file of this patent

UNITED STATES PATENTS

| | | |
|---|---|---|
| 2,172,819 | Howard et al. | Sept. 12, 1939 |
| 2,209,209 | Ruby | July 23, 1940 |
| 2,293,455 | Disch et al. | Aug. 14, 1942 |
| 2,612,128 | Warsaw | Sept. 30, 1952 |
| 2,636,408 | Mitchell | Apr. 28, 1953 |
| 2,724,041 | Anton | Nov. 15, 1955 |
| 2,796,507 | Young | June 18, 1957 |
| 2,870,532 | Young | Jan. 27, 1959 |
| 2,882,380 | Campo | Apr. 14, 1959 |
| 2,931,881 | Larson | Apr. 15, 1960 |
| 3,050,612 | Eversole | Aug. 21, 1962 |

FOREIGN PATENTS

| | | |
|---|---|---|
| 698,408 | Germany | Nov. 8, 1940 |

OTHER REFERENCES

"Soldering Iron Tip," W. J. Richardson, IBM Technical Disclosure Bulletin, vol. 1, No. 2, August 1958, page 18.